(12) United States Patent
Tsujino

(10) Patent No.: US 7,511,739 B2
(45) Date of Patent: Mar. 31, 2009

(54) IMAGE COMBINING APPARATUS FOR COMBINING MULTIPLE EXPOSURE BASED ON LUMINANCE PROPERTIES

(75) Inventor: Kazuhiro Tsujino, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 794 days.

(21) Appl. No.: 10/481,479

(22) PCT Filed: Jun. 14, 2002

(86) PCT No.: PCT/JP02/05985

§ 371 (c)(1),
(2), (4) Date: Dec. 17, 2003

(87) PCT Pub. No.: WO02/103632

PCT Pub. Date: Dec. 27, 2002

(65) Prior Publication Data

US 2004/0233307 A1    Nov. 25, 2004

(30) Foreign Application Priority Data

Jun. 19, 2001    (JP) ............................. 2001-184287
Jul. 13, 2001    (JP) ............................. 2001-213085

(51) Int. Cl.
H04N 5/235    (2006.01)
H04N 5/20    (2006.01)
H04N 5/228    (2006.01)

(52) U.S. Cl. .................. 348/229.1; 348/222.1; 348/255

(58) Field of Classification Search ......... 348/234–236, 348/362, 364, 222.1, 223.1, 272–275, 255, 348/229.1
See application file for complete search history.

(56) References Cited

U.S. PATENT DOCUMENTS

| 5,633,677 | A | * | 5/1997 | Okino et al. | ............. 348/229.1 |
| 5,638,118 | A | * | 6/1997 | Takahashi et al. | ......... 348/221.1 |
| 5,801,773 | A | * | 9/1998 | Ikeda | ...................... 348/229.1 |
| 7,098,946 | B1 | * | 8/2006 | Koseki et al. | ............ 348/229.1 |

FOREIGN PATENT DOCUMENTS

| JP | 06-141229 | 5/1994 |
| JP | 11-355787 | 12/1999 |
| JP | 2000-050160 | 2/2000 |

* cited by examiner

*Primary Examiner*—Tuan V Ho
*Assistant Examiner*—Chia-Wei A Chen
(74) *Attorney, Agent, or Firm*—Gerald T. Bodner

(57) ABSTRACT

A digital camera (10) includes a CCD imager (16). A long-time exposure image signal obtained by a long-time exposure of the CCD imager (16) is applied to a terminal (S1) of a switch (SW1), and a short-time exposure image signal obtained by a short-time exposure of the CCD imager (16) and a gain adjustment is applied to a terminal (S2) of a switch (SW2). A CPU (44) controls the switch (SW1) by comparing a Y level of the long-time exposure image signal with a reference value Ys so as to generate a combined image signal. More specifically, the CPU (44) connects the switch (SW1) with the terminal (S1) when a condition of Y level$\leq$Ys is satisfied, and connects the switch (SW1) with the terminal (S2) when a condition of Y level>Ys is satisfied. The CPU (44) detects a color deviation degree of an object prior to generation of the combined image signal and reduces the reference value Ys on the basis of a detection result. Therefore, the larger color deviation of the object is, the easier selecting of the short-time exposure image signal is.

20 Claims, 21 Drawing Sheets

| PIXEL NUMBER | R | G | B | Y |
|---|---|---|---|---|
| 1 | | | | |
| 2 | | | | |
| 3 | | | | |
| ⋮ | | | | |
| n | | | | |

FIG. 20 PRIOR ART
(A) LONG-TIME EXPOSURE
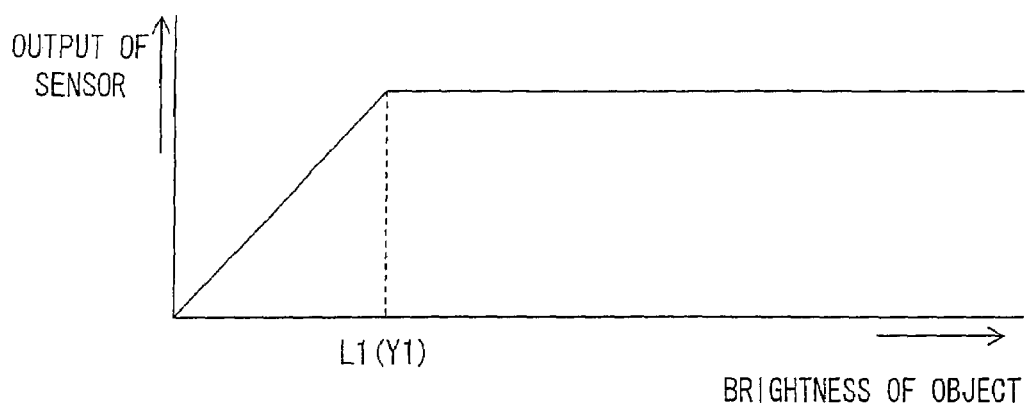
(B) SHORT-TIME EXPOSURE
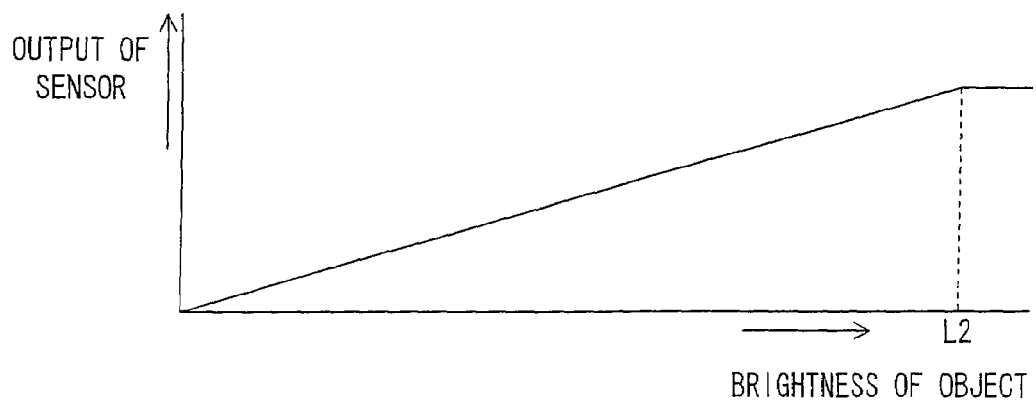

FIG. 22 PRIOR ART
(A) LONG-TIME EXPOSURE IMAGE
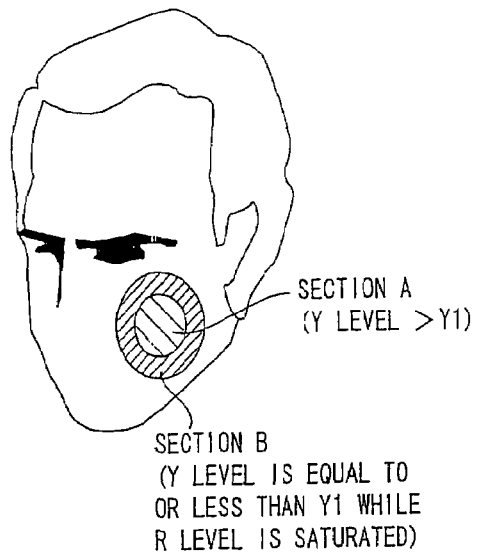
SECTION A (Y LEVEL > Y1)
SECTION B (Y LEVEL IS EQUAL TO OR LESS THAN Y1 WHILE R LEVEL IS SATURATED)
(B) SHORT-TIME EXPOSURE IMAGE (GAIN HAS BEEN APPLIED)
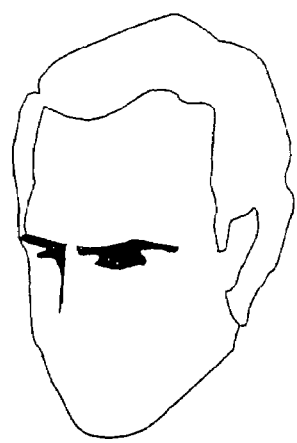
(C) COMBINED IMAGE
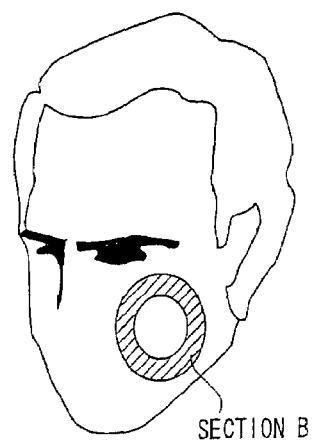
SECTION B

IMAGE COMBINING APPARATUS FOR COMBINING MULTIPLE EXPOSURE BASED ON LUMINANCE PROPERTIES

TECHNICAL FIELD

The present invention relates to an image combining apparatus being applied to a digital camera. More specifically, the present invention relates to an image combining apparatus which generates a combined image signal on the basis of image signals respectively obtained by a long-time exposure and a short-time exposure.

PRIOR ART

In a digital camera, when a shutter button is depressed, a YUV signal is generated on the basis of an RGM signal obtained by a pre-exposure of an image sensor, and an optimal exposure amount is determined such that an integral value (luminance evaluation value) of a Y signal satisfies a predetermined condition. A main exposure of the image sensor is performed according to the optimal exposure amount, and a YUV signal based on the RGB signal thus obtained is recorded on a recording medium.

Furthermore, as a digital camera, there is one, when a dynamic range extension mode is selected, which performs a long-time exposure and a short-time exposure of the same object and combines with each other a long-time exposure image signal and a short-time exposure image signal to which a gain is applied.

Output characteristics of an image sensor in the long-time exposure and the short-time exposure vary as shown in FIG. 20(A) and FIG. 20(B), for example. According to FIG. 20(A), at a time that brightness of an object, i.e. intensity of reflected light from the object reaches L1, an output of the image sensor is saturated. On the other hand, according to FIG. 20(B), at a time that the brightness of the object reaches L2 (>L1), an output of the image sensor is saturated. Therefore, a Y level of each of pixels forming a long-time exposure image signal is compared with a reference value Y1 corresponding to the brightness L1, and if the long-time exposure image signal is selected when a condition of Y level<Y1 is satisfied and if a short-time exposure image signal to which a gain N is applied is selected when a condition of Y level≧Y1 is satisfied, a combined image signal in which a dynamic range is extended can be obtained as shown in FIG. 21.

However, if there is a deviation in a color of the object, even if photographing the object at an optimal exposure amount, a color level of a specific color is saturated. For example, taking notice of a ratio of an RGB signal at a time of macro-imaging a face of a person (skin color), an R level is much higher than a G level and a B level. Since a Y signal is generated on the basis of the RGB signal, when the ratio of the RGB signal is extremely distorted, even if the optimal exposure amount is determined so that the luminance evaluation value satisfies a predetermined condition, the level of the R signal obtained by the main exposure is saturated. Consequently, the ratio of the RGB signal is deviated from an original ratio, and therefore, a hue of the image to be reproduced is also distorted.

A problem of such the distortion of the hue conspicuously occurs when the object deviated to the specific color is photographed in the dynamic range extension mode. For example, in a case the Y level of a section A forming a face exceeds the reference value Y1, and the Y level of a section B is equal to or less than the reference value Y1 and the R level thereof is saturated as a long-time exposure image shown in FIG. 22(A), if the long-time exposure image is combined with a short-time exposure image (to which a gain has been applied) shown in FIG. 22(B), an combined image in which only the hue of the section B is distorted as shown in FIG. 22(C) is generated. In this case, the section B is displayed so as to be raised, and the distortion of the hue is more conspicuous than that in the long-time exposure image shown in FIG. 22(A).

SUMMARY OF THE INVENTION

Therefore, it is a primary object of the present invention to provide a novel image combining apparatus.

Another object of the present invention is to provide an image combining apparatus capable of minimize a distortion of a hue of a combined image signal.

Further object of the present invention is to provide an image combining method capable of minimizing occurrence a distortion in a hue of a combined image signal.

According to the present invention, an image combining apparatus which generates, on the basis of a first image signal of an object obtained by a first exposure according to a first exposure amount and a second image signal of the object obtained by a second exposure according to a second exposure amount which is less than the first exposure amount, a combined image signal of the object, comprising: a comparing means for comparing a brightness relating level of any one of the first image signal and the second image signal with a reference value; a first selecting means for selecting the first image signal when the brightness relating level is equal to or less than the reference value; a second selecting means for selecting the second image signal when the brightness relating level is larger than the reference value; a deviation degree detecting means for detecting a deviation degree of color of the object; and a reducing means for reducing the reference value on the basis of the deviation degree.

When the combined image signal is generated on the basis of the first image signal obtained by the first exposure according to the first exposure amount and the second image signal obtained by the second exposure according to the second exposure amount, the brightness relating level of any one of the first image signal and the second image signal is compared with the reference value by the comparing means. When the brightness relating level is equal to or less than the reference value, the first image signal is selected by the first selecting means, and when the brightness relating level is larger than the reference level, the second image signal is selected by the second selecting means. Thus, the combined image signal is generated. On the other hand, the deviation degree detecting means detects the deviation degree of the color of the object, and the reducing means reduces the reference level on the basis of the detected deviation degree.

Since the second exposure amount is less than the first exposure amount, even if the color of the object is deviated to the specific color, a color component of the specific color is hard to saturate, and the hue of the second image signal is hard to distort. If the reference value is reduced according to the detected deviation degree, the second image signal becomes easy to be selected, and it is possible to prevent a situation in which a distortion occurs in the hue of the combined image signal.

In a case of fetching a third image signal of the object obtained by an exposure according to a predetermined exposure amount, the deviation degree can be obtained by detecting a color saturation degree and a luminance saturation degree of the specific color on the basis of the third image signal and subtracting the luminance saturation degree from the color saturation degree. When all the color levels of the specific color are saturated, the luminance level is also saturated. Thereupon, a pixel in which the color level of the specific color is saturated but the luminance level thereof is not saturated is regarded as being deviated to the specific color. Therefore, by subtracting the luminance saturation degree from the color saturation degree, the deviation degree can be obtained.

If the number of pixels in which the color level of the specific color is saturated is regarded as the color saturation degree, and if the number of pixels in which the luminance is saturated is regarded as the luminance saturation degree, it is possible to accurately and easily calculate the deviation degree.

It is noted that the predetermined exposure amount is preferably less than the first exposure amount and is more than the second exposure amount.

In one embodiment, the greater the deviation degree is, the larger the reference value is reduced. Thus, the greater the deviation degree is, the easier the selection of the second image signal is.

In another embodiment, it is determined whether or not each of a plurality of sections forming the object image satisfies the predetermined condition. The reducing means weights the deviation degree depending upon the number of the sections satisfying the predetermined condition and reduces the reference value based on a result of the weighting. The predetermined condition preferably includes a first condition indicating that a noticed section is a specific color, and the second condition indicating that the noticed section has a high luminance.

According to the present invention, an image combining method which generates, on the basis of a first image signal of an object obtained by a first exposure according to a first exposure amount and a second image signal of the object obtained by a second exposure according to a second exposure amount which is less than the first exposure amount, a combined image signal of the object, comprising following steps of: (a) comparing a brightness relating level of any one of the first image signal and the second image signal with a reference value; (b) selecting the first image signal when the brightness relating level is equal to or less than the reference value; (c) selecting the second image signal when the brightness relating level is larger than the reference value; (d) detecting a deviation degree of color of the object; and (e) reducing the reference value on the basis of the deviation degree.

When the combined image signal is generated on the basis of the first image signal obtained by the first exposure according to the first exposure amount and the second image signal obtained by the second exposure according to the second exposure amount, the brightness relating level of any one of the first image signal and the second image signal is compared with the reference value. When the brightness relating level is equal to or less than the reference value, the first image signal is selected, and when the brightness relating level is larger than the reference value, the second image signal is selected. Thus, the combined image signal is generated. Herein, the reference value is reduced based on the deviation degree of the color of the object.

Since the second exposure amount is less than the first exposure amount, even if the color of the object is deviated to the specific color, a color component of the specific color is hard to saturate, and a hue of the second image signal is hard to distort. If the reference value is reduced according to the detected deviation degree, the second image signal becomes easy to be selected, and it is possible to prevent a situation in which a distortion occurs in the hue of the combined image signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing one example of a table storing an RGB signal and a Y signal;

FIG. 20(A) is a graph showing an output of a sensor with respect to brightness of an object when performing a long-time exposure;

FIG. 20(B) is a graph showing an output of a sensor with respect to the brightness of the object when performing a short-time exposure;

FIG. 22(A) is an illustrative view showing an example of a long-time-exposure image;

FIG. 22(B) is an illustrative view showing an example of a short-time-exposure image to which a gain is applied; and FIG. 22(C) is an illustrative view showing an example of a combined image.

BEST MODE FOR PRACTICING THE INVENTION

Figure 1:
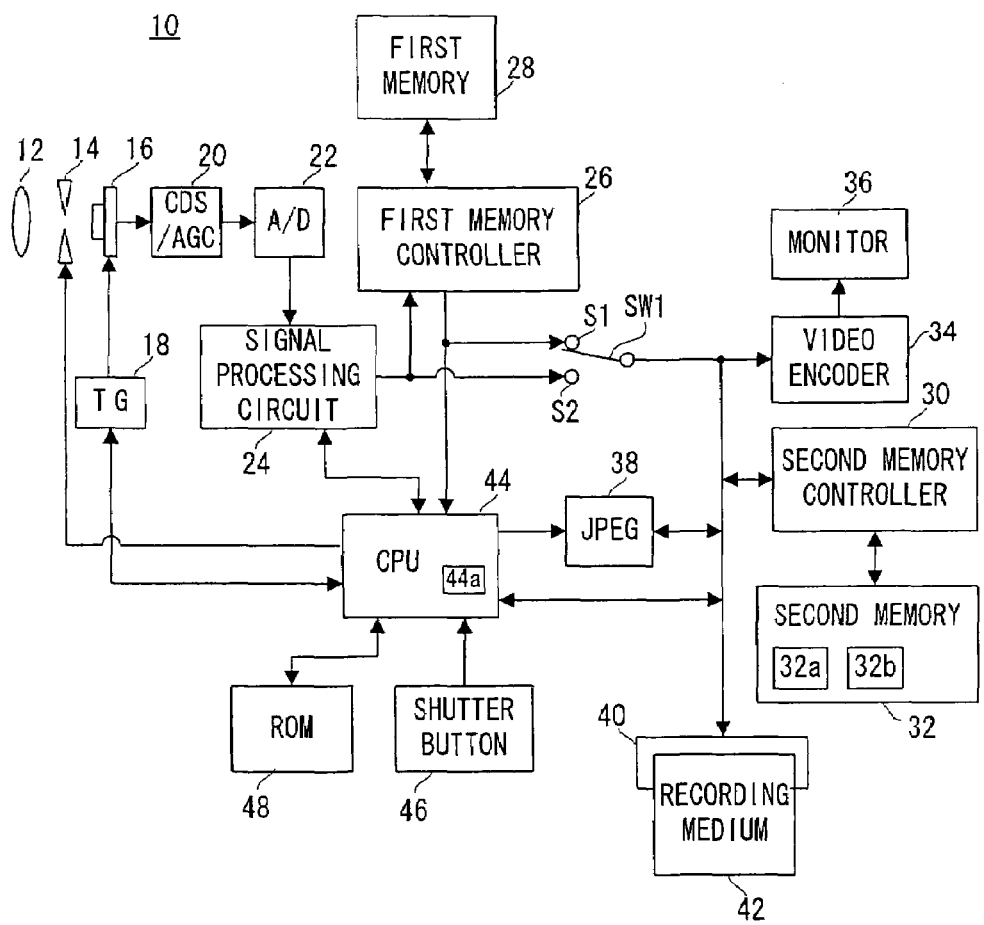
FIG. 1 is a block diagram showing one embodiment of the present invention.

Referring to FIG. 1, a digital camera 10 of this embodiment includes an optical lens 12 and an aperture member 14. An optical image of an object is incident onto a receiving surface of the CCD imager (image sensor) 16 through these members. A camera signal corresponding to the incident optical image, i.e., raw image signal is generated by a photo-electronic conversion on the light-receiving surface. It is noted that a light-receiving surface is covered with a primary color filter having a Bayer array (not shown), and each of pixel signals forming the camera signal has color information of any one of R, G and B.

When a power is turned on, a CPU 44 respectively sets an aperture amount and an exposure time period to the aperture member 14 and a TG (Timing Generator) 18, and instructs the TG 18 to perform an exposure at every 1/15 seconds. The TG 18 exposes the CCD imager 16 at every 1/15 seconds and reads the camera signal generated by the exposure from the CCD imager 16. The camera signal of each frame read at every 1/15 seconds is applied to an image processing circuit 24 through a well-known noise removal and a level adjustment in a CDS/AGC circuit 20 and an A/D conversion in an A/D converter 22.

Figure 2:
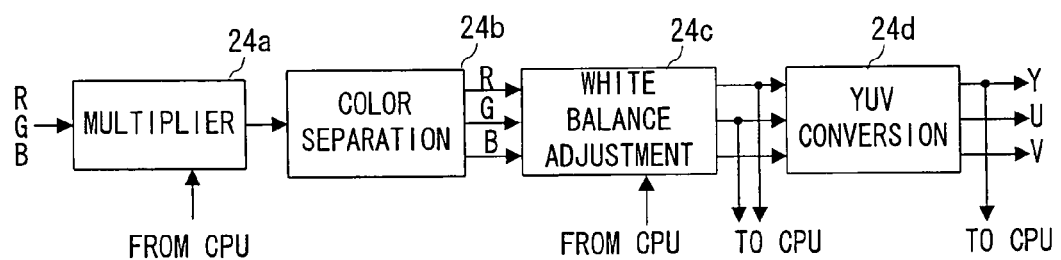
FIG. 2 is a block diagram showing one example of a signal processing circuit applied to FIG. 1 embodiment.
Figure 3:
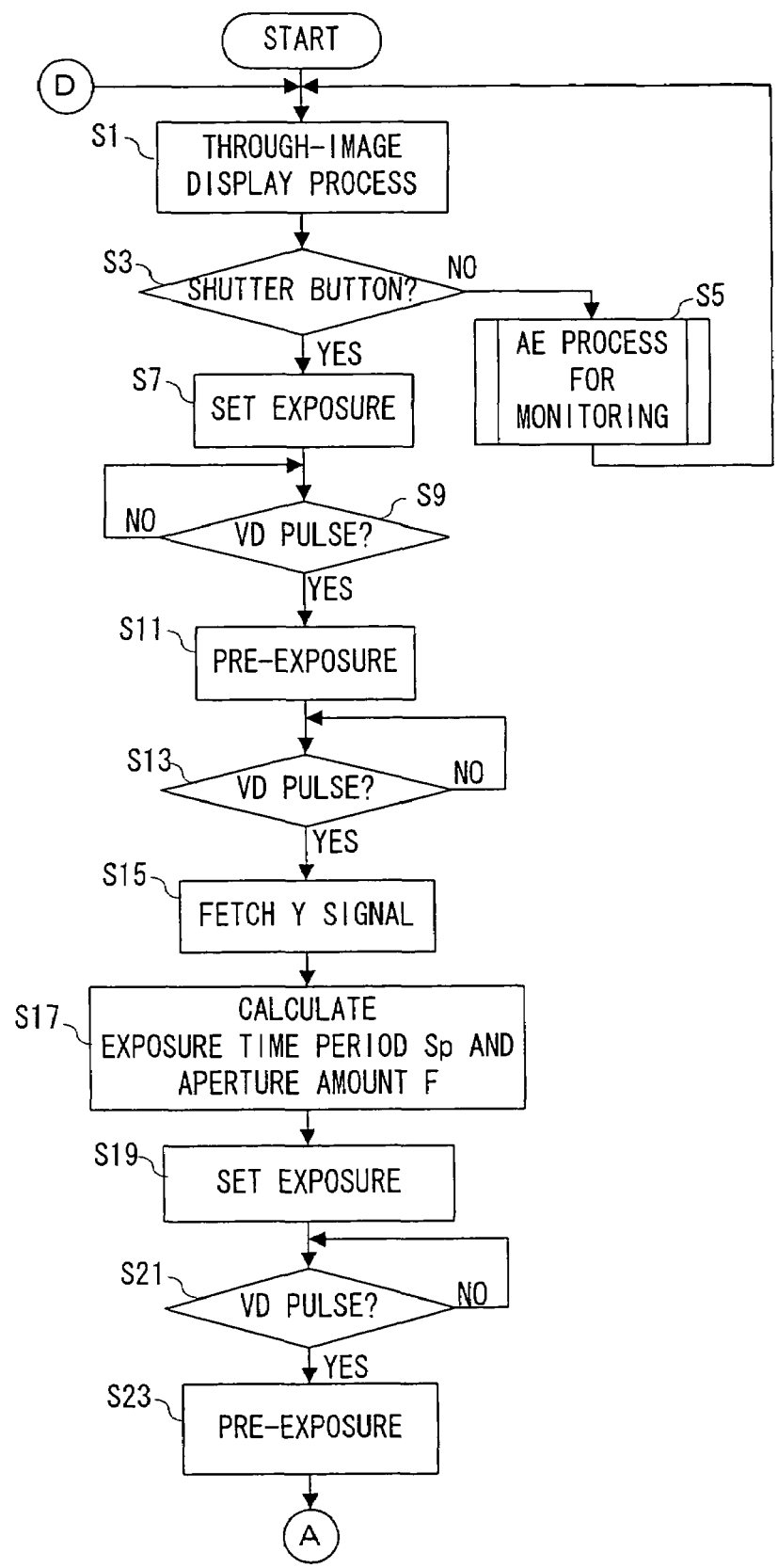
FIG. 3 is a flowchart showing a part of an operation of a CPU applied to FIG. 1 embodiment.
Figure 4:
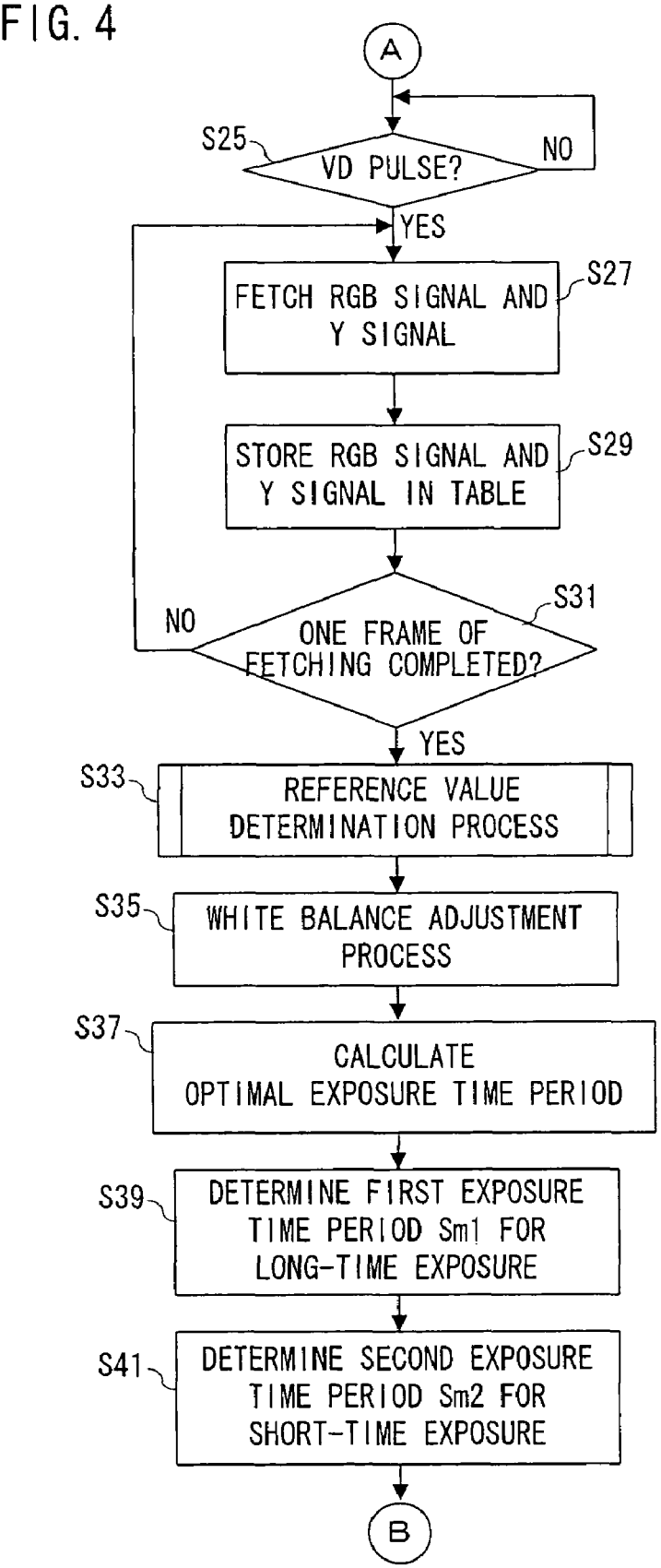
FIG. 4 is a flowchart showing another part of the operation of the CPU applied to FIG. 1 embodiment.
Figure 5:
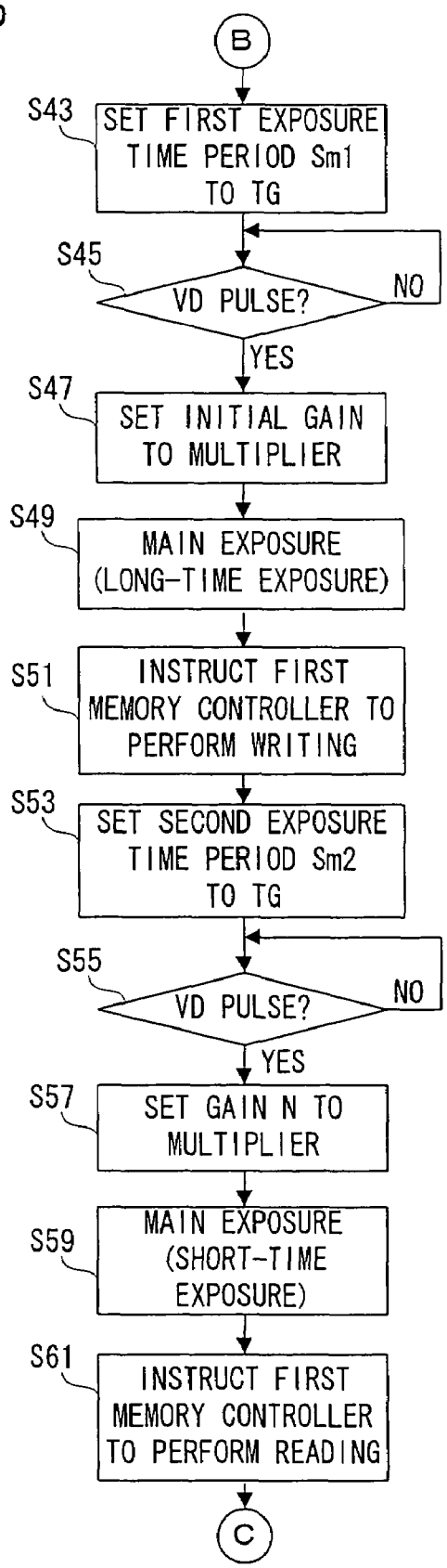
FIG. 5 is a flowchart showing the other part of the operation of the CPU applied to FIG. 1 embodiment.
Figure 6:
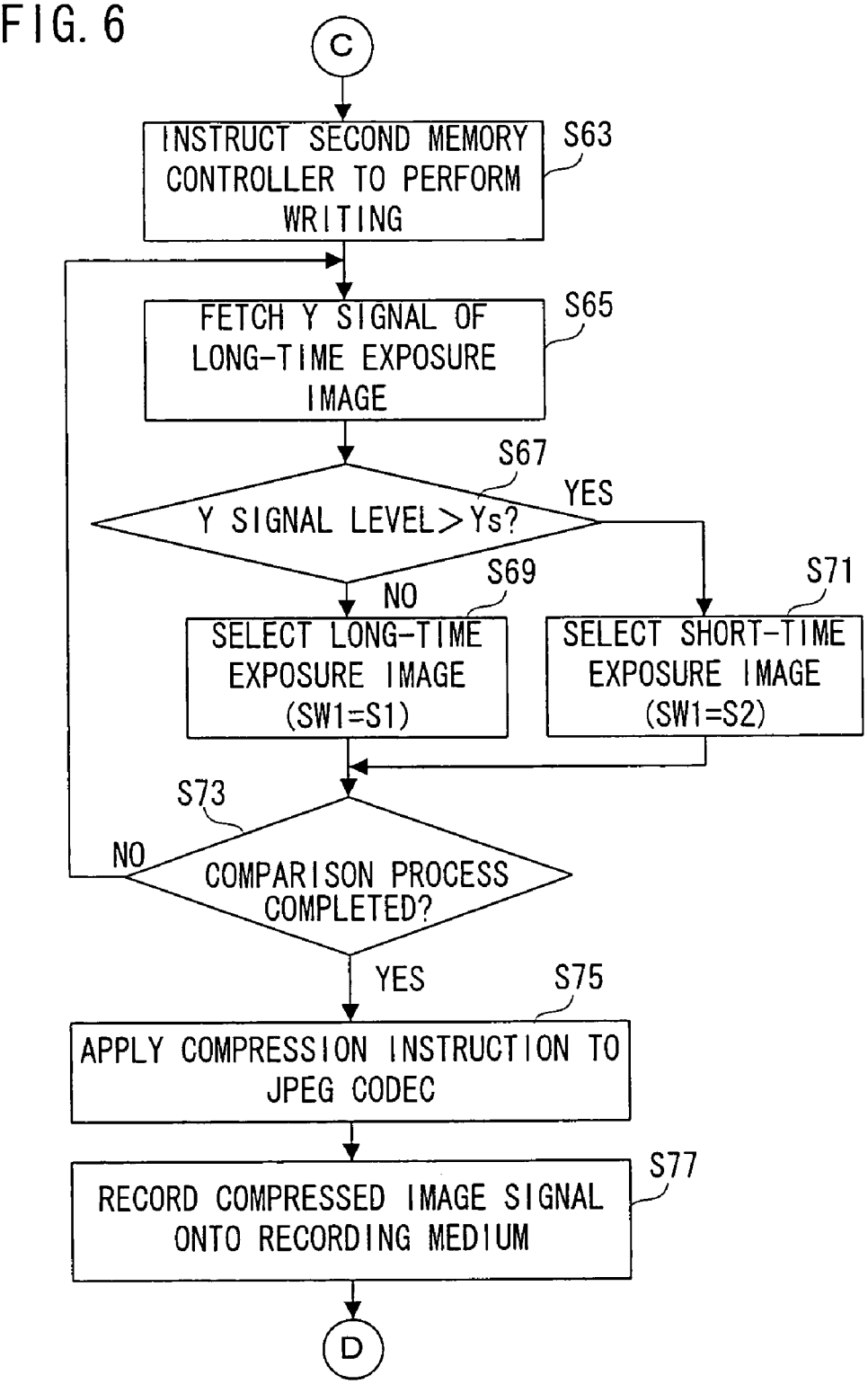
FIG. 6 is a flowchart showing a further part of the operation of the CPU applied to FIG. 1 embodiment.

The signal processing circuit 24 is constituted as shown in FIG. 2. The camera signal is applied with a gain (initial value) in a multiplier 24a and is subjected to a color separation in a color separation circuit 24a. Each of pixels forming the camera signal only has any one of an R information signal (R signal), a G information signal (G signal) and a B information signal (B signal), and therefore, two color information signals lacking in each of the pixels is complemented by the color separation circuit 24b. The R signal, the G signal and the B signal forming respective pixels are simultaneously output from the color separation circuit 24b. The R signal, the G signal and the B signal output at every pixel are applied to a YUV conversion circuit 24d through a white balance adjustment circuit 24c, and whereby, an image signal constructed by a Y signal (luminance signal), a U signal (color difference: R-Y) and a V signal (color difference: B-Y) is generated.

Returning to FIG. 1, a switch SW1 is connected to a terminal S2, and the image signal output from the signal processing circuit 24 is applied to a second memory controller 30 via the switch SW1. The second memory controller 30 writes the applied image signal to an image signal storage area 32a of a second memory 32.

A video encoder 34 reads the image signal in the image signal storage area 32a via the second memory controller 30, encodes the read image signal of each frame onto a composite image signal of an NTSC format and applies the encoded composite image signal to an LCD monitor 36. The LCD monitor 36 is displayed with a real-time motion image, i.e., through image of the object at a ratio of 15 fps.

When a shutter button 46 is depressed, the CPU 44 instructs the TG 18 to perform a pre-exposure and fetches the RGB signal and the Y signal generated by the signal processing circuit 24 on the basis of the pre-exposure. The CPU 44 determines a reference value Ys for image combining based on the R signal and the G signal, adjusts a white balance based on the RGB signal and determines a first exposure time period Sm1 for long-time exposure and a second exposure time period Sm2 for short-time exposure based on the Y signal. The determined first exposure time period Sm1 is longer than an optimal exposure time period at a time of performing normal photographing (in which a main exposure is performed only once), and the second exposure time period Sm2 is shorter than the optimal exposure time period. Succeedingly, the CPU 44 instructs the TG 18 to respectively perform a long-time exposure (main exposure according to the first exposure time period Sm1) and a short-time exposure (main exposure according to the second exposure time period Sm2) at noticed two frames. The TG 18 performs the long-time exposure on the CCD imager 16 at a first frame out of the noticed two frames, and performs reading of a camera signal generated by the long-time exposure and performs the short-time exposure on the CCD imager 16 at a second frame. A camera signal generated by the short-time exposure is read from the CCD imager 16 at a frame successive to the second frame.

The CPU 44, when a long-time exposure image signal (image signal based on the long-time exposure) is output from the signal processing circuit 24, instructs a first memory controller 26 to perform writing. The long-time exposure image signal is stored in the first memory 28 by the first memory controller 26. The CPU 44, when the camera signal generated by the short-time exposure is read from the CCD imager 16, further changes the gain of the multiplier 24a shown in FIG. 2 from an initial value to a predetermined value N and instructs the first memory controller 26 to read the long-time exposure image signal. A short-time exposure image signal which is based on the short-time exposure and to which the gain is applied is output from the signal processing circuit 24, and the long-time exposure image signal is output from the first memory controller 26. The long-time exposure image signal and the short-time exposure image signal corresponding to the same pixel are simultaneously applied to a terminal S1 and the terminal S2 of the switch SW1.

The CPU 44 further fetches the Y signal of each of pixels forming the long-time exposure image signal, compares the level of the fetched Y signal with the reference value Ys at every pixel and controls switching of the switch SW1 in response to a comparison result. The switch SW1 is connected to the terminal S1 when a condition of Y signal level≦Ys is satisfied and is connected to the terminal S2 when a condition of Y signal level>Ys is satisfied. When connecting to the terminal S1, a pixel signal forming the long-time exposure image signal is selected, and when connecting to the terminal S2, a pixel signal forming the short-time exposure image signal is selected, and whereby, a combined image signal having a dynamic range extended is generated.

When the combined image signal is output from the switch SW1, the CPU 44 instructs the second memory controller 30 to perform writing. The combined image signal is temporarily stored in the image signal storage area 32a of the second memory 32 by the second memory controller 30. The CPU 44 succeedingly instructs a JPEG codec 38 to perform a compression process. The JPEG codec 38 reads the combined image signal stored in the image signal storage area 32a through the second memory controller 30 and performs a compression process complying with a JPEG format on the read combined image signal. When a compressed image signal is obtained, the JPEG codec 38 applies the generated compressed image signal to the second memory controller 30. The compressed image signal is stored in a compressed signal storage area 32b by the second memory controller 30.

When a storing process of the compressed image signal is completed, the CPU 44 reads the compressed image signal from the compressed signal storage area 32b through the second memory controller 30 and records the read compressed image signal onto a memory card 42. Thus, an image file is created within the memory card 42. It is noted that the memory card 42 is a detachable nonvolatile recording medium and becomes accessible by the CPU 44 when being loaded in a slot 40.

When the power is turned on, a process according to a flowchart shown in FIG. 3 to FIG. 7 is executed by the CPU 44. It is noted that a control program corresponding to the flowchart is stored in a ROM 48.

First, a through image displaying process is performed in a step S1, and it is determined whether or not the shutter button 46 is operated in a step S3. While the shutter button 46 is not operated, an AE process for monitoring is performed in a step S5 and then, the process returns to the step S1. Thus, an aperture amount set to the aperture member 14 and an exposure time period set to the TG 18 are repeatedly adjusted, and whereby, the through image having moderate brightness is displayed on the monitor 36. It is noted that the processes in the steps S1 and S5 are executed in response to a VD pulse generated from the TG 18 at every 1/15 seconds.

When the shutter button 46 is operated, an exposure setting for metering is performed in a step S7. More specifically, the exposure time period of 1/1200 seconds is set to the TG 18, and the aperture amount of a maximum opening is set to the aperture member 14. It is determined whether or not the VD pulse is applied from the TG 18 in a step S9, and if "YES", a pre-exposure for metering is instructed to the TG 18 in a step S11. The TG 18 performs the pre-exposure 1/200 seconds at a current frame on which the instruction is applied and reads from the CCD imager 16 a camera signal generated by the pre-exposure at a next frame successive to the current frame. A Y signal based on the read camera signal is output from the YUV conversion circuit 24d shown in FIG. 2 at the frame in which the reading has been performed. Therefore, it is determined whether or not the VD pulse is generated in a step S13, and if "YES" is determined, one frame of Y signal is fetched from the YUV conversion circuit 24d in a step S15. The fetched one frame of Y signal is the Y signal based on the pre-exposure in the step S11.

In a step S17, an exposure time period Sp and an aperture amount F are calculated on the basis of the fetched Y signal. More specifically, a luminance evaluation value Iy is obtained by integrating the Y signal throughout one frame period, and then, the exposure time period Sp and the aperture amount F in which the luminance evaluation value Iy satisfies a predetermined condition are calculated. In a step S19, the aperture amount F is set to the aperture member 14, and the exposure time period Sp is set to the TG 18. It is noted that the exposure setting in the step S19 is for determining the reference value Ys, the white balance adjustment and the optimal exposure time.

Figure 8:
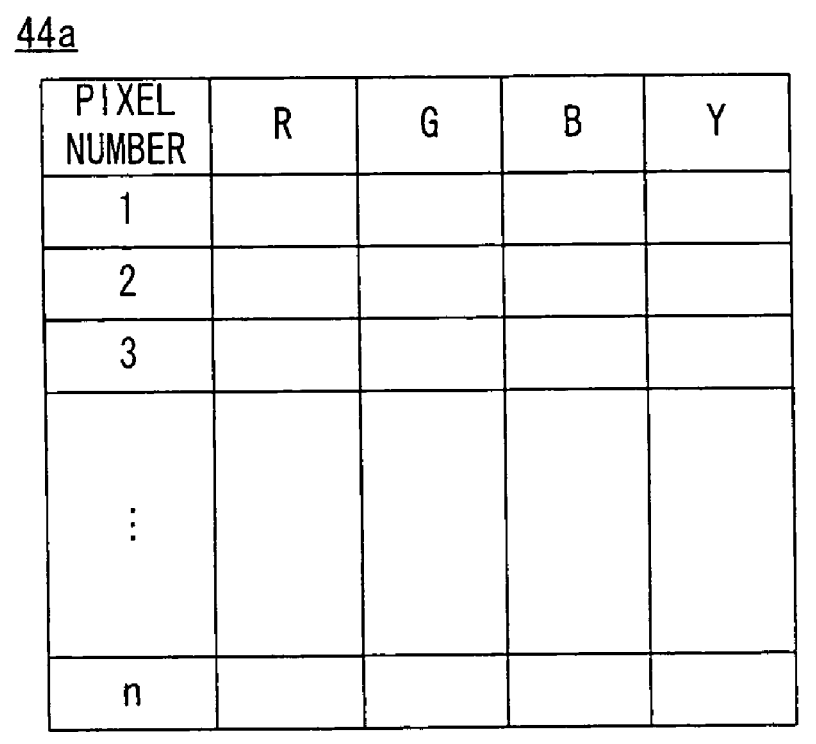

When the VD pulse is generated after completion of the exposure setting, "YES" is determined in a step S 21, and the pre-exposure is instructed to the TG 18 in a step S23. The TG 18 performs the pre-exposure according to the exposure time period Sp and reads the camera signal generated by the pre-exposure from the CCD imager 16. When the VD pulse is generated after the instruction of the pre-exposure, the process proceeds from a step S25 to a step S27 so as to fetch the RGB signal output from the white balance adjustment circuit 24c shown in FIG. 2 and the Y signal output from the YUV conversion circuit 24d. Both of the RGB signal and the Y signal fetched are signals based on the pre-exposure in the step S23. In a step S29, the fetched RGB signal and Y signal are stored in a table 44a shown in FIG. 8. At this time, a common pixel number is assigned to the RGB signal and the Y signal of the same pixel. It is determined whether or not one frame fetching of the signal is completed in a step S31, and the processes in the steps S27 and S29 are repeated until "YES" is determined.

The reference value Ys is determined on the basis of the fetched R signal and G signal in a step S33, the gain of the white balance adjustment circuit 22 is set to an optimal value on the basis of the fetched RGB signal in a step S35, and an optimal exposure time period is calculated on the basis of the fetched Y signal in a step S37. The optimal exposure time period calculated in the step S37 is an exposure time period which becomes optimal in a case the main exposure is performed once, and therefore, a time period longer than the optimal exposure time period is determined to be the first exposure time period Sm1 for long-time exposure in a step S39, and a time period shorter than the optimal exposure time period is determined to be the second exposure time period Sm2 for short-time exposure in a step S41.

The first exposure time period Sm1 is set to the TG 18 in a step S43, and then, "YES" is determined in a step S45 in response to generation of the VD pulse. Thereupon, the initial gain is set to the multiplier 24a shown in FIG. 2 in a step S47, a main exposure is instructed to the TG 18 in a step S49, and a writing instruction is applied to the first memory controller 26 in a step S51. The TG 18 performs the long-time exposure according to the first exposure time period Sm1 and reads a camera signal thus generated from the CCD imager 16. The read camera signal has a characteristic shown in FIG. 20 (A). The signal processing circuit 24 generates a long-time exposure image signal on the basis of the camera signal, and the generated long-time exposure image signal is written to the first memory 28 by the first memory controller 26.

The second exposure time period Sm2 is set to the TG 18 in a step S53, and then, "YES" is determined in a step S55 in response to generation of the VD pulse. The gain N is set to the multiplier 24a in a step S57, the main exposure is instructed to the TG 18 in a step S59, and a reading instruction is applied to the first controller 26 in a step S61. The TG 18 performs the short-time exposure according to the second exposure time period Sm2, and a camera signal thus generated has a characteristic shown in FIG. 20(B). The signal processing circuit 24 generates a short-time exposure image signal to which the gain N is applied on the basis of the camera signal obtained by the short-time exposure. On the other hand, the first memory controller 26 reads the long-time exposure image signal from the first memory 28 in response to the reading instruction.

Consequently, the long-time exposure image signal and the short-time exposure image signal are simultaneously applied to the terminals S1 and S2 forming the switch SW1. That is, an X-th pixel signal forming the short-time exposure image signal is applied to the terminal S2 at the same time that the X-th pixel signal forming the long-time exposure image signal is applied to the terminal S1.

A writing instruction is applied to the second memory controller 30 in a step S63, and a Y signal is fetched from the first memory controller 26 in a following step S65. The fetched Y signal is the Y signal forming the long-time exposure image signal, and a timing when the X-th Y signal is fetched is little faster than a timing when the X-th pixel signal (YUV signal) is applied to the terminal S1. The level of the fetched Y signal is compared with the reference value Ys in a step S67. Then, if a condition of Y signal level >Ys is satisfied, the process proceeds to a step S69, and if a condition of Y signal level ≦Ys is satisfied, the process proceeds to a step S71. The switch SW1 is connected to the terminal S1 so as to select the long-time exposure image signal in the step S69, and the switch SW1 is connected to the terminal S2 so as to select the short-time exposure image signal in the step S71. It is determined whether or not one frame of a comparison process is completed in a step S73, and the processes from the steps S65 to S71 are repeated until "YES" is determined.

Figure 21:
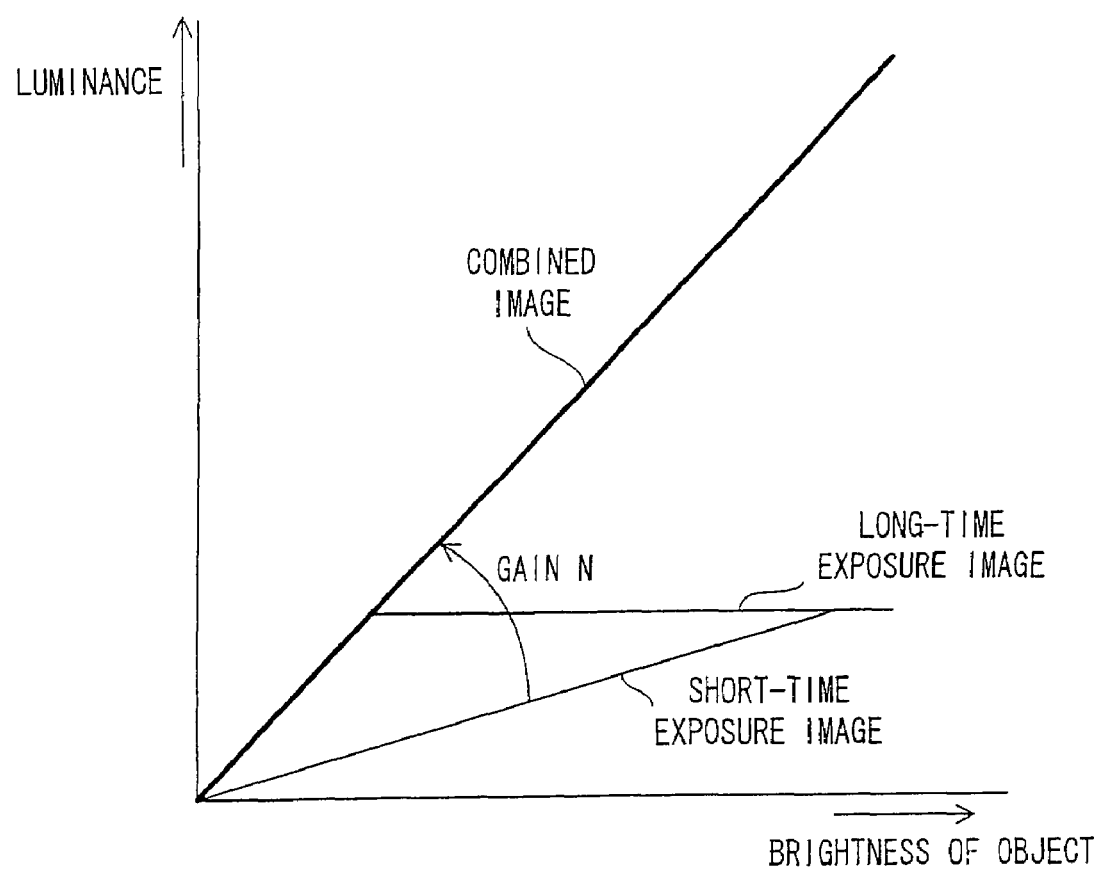
FIG. 21 is an illustrative view showing a combining process of a long-time exposure image signal and a short-time exposure image signal.

Thus, one frame of combined image signal having a characteristic shown in FIG. 21 is generated. Prior to switching control of the switch SW 1, the writing instruction is applied to the second memory controller 30, and therefore, the generated combined image signal is stored in the images signal storage area 32a of the second memory 32 by the second memory controller.

A compression instruction is applied to the JPEG codec 38 in a step S75, and a compressed image signal generated by the JPEG coded 38 and held in the compressed signal storage area 32b of the SDRAM 32 is recorded onto the memory card 42 in a file format in a step S77. After completion of such the recording process, the process returns to the step S1.

Figure 7:
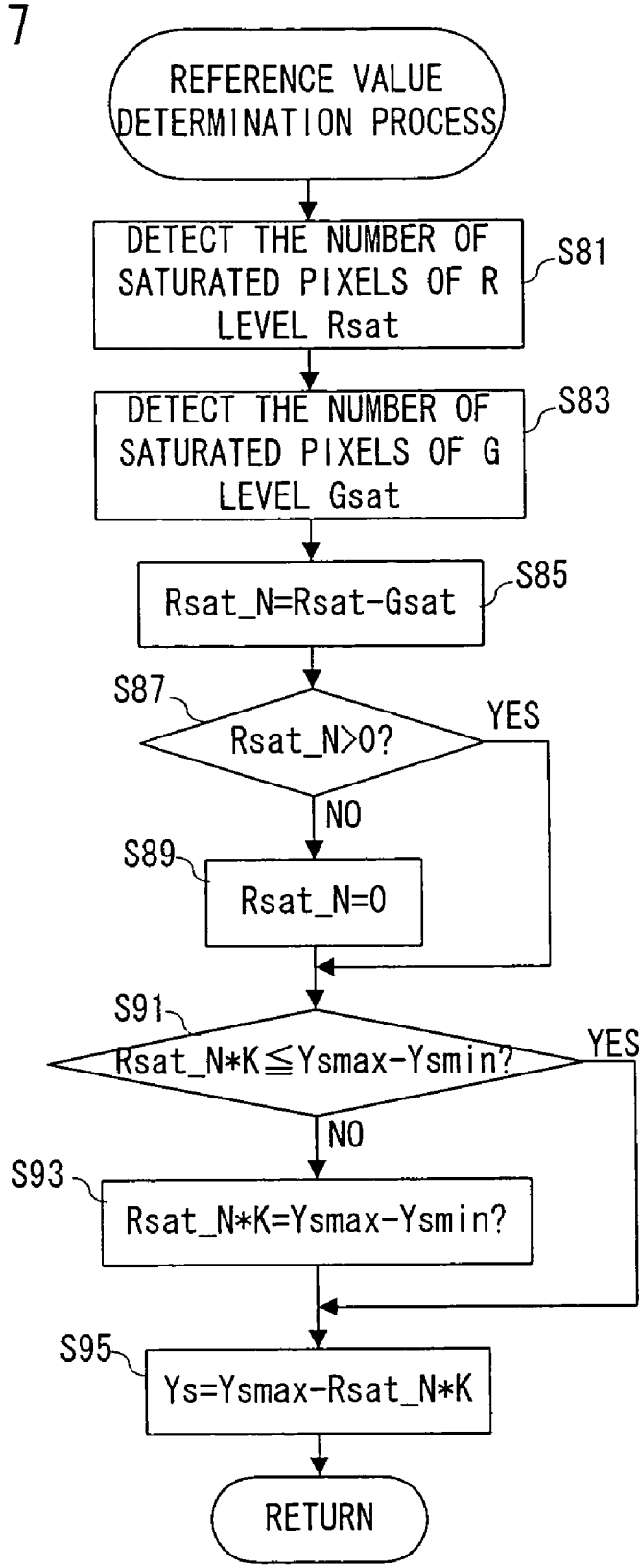
FIG. 7 is a flowchart showing another part of the operation of the CPU applied to FIG. 1 embodiment.

The reference value determining process in the step S33 is executed in a subroutine shown in FIG. 7. First, the total number of pixels in which the R signal level is saturated is detected as Rsat in a step S81, and the total number of pixels in which the G signal level is saturated is detected as Gsat in a step S83. These processes are performed by comparing a threshold value with each of R signal and G signal stored in the table 44a, and the number of pixels in which an R level exceeds the threshold value and the number of pixels in which a G level exceeds the threshold value is rendered the Rsat and Gsat, respectively. The detected Rsat and Gsat are respectively defined as color saturation degrees of the R signal and the G signal.

A difference number of pixels Rsat_N is calculated by subtracting the Gsat from the Rsat in a step S85. It is determined whether or not the Rsat_N is larger than "0" in a step S87. If "YES", the process directly proceeds to a step S91, and if "NO", "0" is set to the Rsat_N in a step S89 and then, the process proceeds to the step S91.

The Y signal is generated by weighting and adding of the R signal, the G signal and the B signal in the ratio of 3:6:1, and therefore, the G signal exerts the greatest influence upon the Y signal. Furthermore, when the G signal is saturated, the R signal and the B signal are also saturated (i.e., the luminance level is saturated), and there never occurs a situation that the G signal is saturated while the R signal and the B signal are not saturated. Therefore, the Gsat can be defined as a luminance saturation degree. Thereupon, the Rsat_N calculated in the step S87 can be regarded as the total number of pixels in which no luminance saturation occurs and the R signal level is saturated, and can be regarded as a deviation degree of the R signal in reference to the G signal.

It is noted that the processes in the steps S87 and S89 are of taken into account that there is a possibility that the Rsat_N indicates a numerical value of minus (−) by an error of the setting in the signal processing circuit 24. Furthermore, the reason why the Rsat_N relating to the R signal is calculated is that the R signal exerts the greatest influence upon a color of a skin of a person.

It is determined whether or not a condition shown in an equation 1 is satisfied in a step S91. If the condition is satisfied, the process directly proceeds to a step S95 while if the condition is not satisfied, the Rsat_N is renewed according to an equation 2 in a step S93 and then, the process proceeds to the step S95. In the step S95, the reference value Ys is determined according to an equation 3.

$$R\text{sat}\_N * K \leq Y\text{smax} - Y\text{smin} \qquad [\text{equation 1}]$$

K: constant
Ysmax: maximum value which the Ys can take
Ysmin: minimum value which the Ys can take $$R\text{sat}\_N * K = Y\text{smax} - Y\text{smin} \qquad [\text{equation 2}]$$

$$Y_s = Y\text{smax} - R\text{sat}\_N * K \qquad [\text{equation 3}]$$

Since the Ysmax and the Ysmin are respectively a maximum value and a minimum value which the Ys can take, the Ys has to be determined in the Ysmax to the Ysmin range. According to the equation 3, the Ys is obtained by subtracting the Rsat_N *K from the Ysmax, and therefore, the Rsat_N*K has to be equal to or less than "Ysmax-Ysmin" in order to make the Ys fall within the Ysmax to the Ysmin range. Thus, when the condition of the equation 1 is not satisfied, the Rsat_N*K is corrected according to the equation 2.

As understood form the above description, when the combined image signals is generated on the basis of the long-time exposure image signal and the short-time exposure image signal, the Y signal level of the long-time exposure image signal is compared with the reference value Ys (S67). Then, when the condition of Y signal level ≦Ys is satisfied, the long-time exposure image signal is selected by the switch SW1 (S69), and when the condition of Y signal level >Ys is satisfied, the short-time exposure image signal is selected by the switch SW1 (S71). Thus, the combined image signal is generated. The deviation degree of the color of the object is detected prior to the switching control of the switch SW1 (S81 to S85), and the reference value is reduced on the basis of the detected deviation degree (S95).

The deviation degree of the color of the object is obtained by respectively detecting the color saturation degree of the R level and the color saturation degree of the G level (=luminance saturation degree) on the basis of the R signal and the G signal obtained by the pre-exposure (S81, S83) and subtracting the luminance saturation degree from color saturation degree (S85). When all the R level, the G level and the B level are saturated, the Y level is also saturated. Thus, a pixel in which the R level is saturated but the Y level is not saturated can be regarded as being deviated to red. Therefore, the deviation degree to red is obtained by subtracting the color saturation degree of the G level from the color saturation degree of the R level.

In a case of the short-time exposure, even if the color of the object is deviated to a specific color, a color component of the specific color is hard to saturate, and a hue of the short-time exposure image signal is also hard to distort. Thus, if the reference value Ys is reduced on the basis of the detected deviation degree, the short-time exposure image signal is easy to be selected, and it is possible to prevent a situation in which the distortion of the hue in the combined image signal occurs.

It is noted that the Gsat is subtracted from the Rsat at a time of acquiring the Rsat_N in this embodiment; however, it is also appropriate that the total number of the pixels in which the level of the Y signal is saturated is detected as Ysat and then, the Ysat is subtracted from the Rsat. Furthermore, although the aperture amount takes a constant (aperture amount obtained by the pre-exposure) and the exposure time period is varied at a time of performing the long-time exposure and short-time exposure in this embodiment, the aperture amount may be varied in addition to or in place of the exposure time period.

Furthermore, although the reference value Ys is determined on the basis of the Rsat_N in this embodiment, Bsat_N (=Bsat−Gsat) is calculated and then, the reference value Ys may be determined on the basis the Bsat_N. If so, with respect to a color including a large number of B signals, it is possible to prevent a situation in which a section distorted in hue is raised.

In addition, although the reference value Ys is linearly changed in accordance with a value of the Rsat_N in the arithmetic operation according to the equation 3, the reference value Ys may be nonlinearly (according to a quadratic function) changed in accordance with the value of the Rsat_N. Furthermore, although the long-time exposure is performed prior to the short-time exposure in this embodiment, an order reverse thereto may be appropriate.

Also, when acquiring the Rsat_N, the total number of pixels Gsat in which the G level is saturated is subtracted from the total number of pixels Rsat in which the R level is saturated in this embodiment. However, it is also appropriate that the R level and the G level are compared with a threshold value pixel by pixel, the number of pixels in which the R level is saturated but the G level is not saturated is integrated, and the integral may be defined as the Rsat_N.

Figure 9:
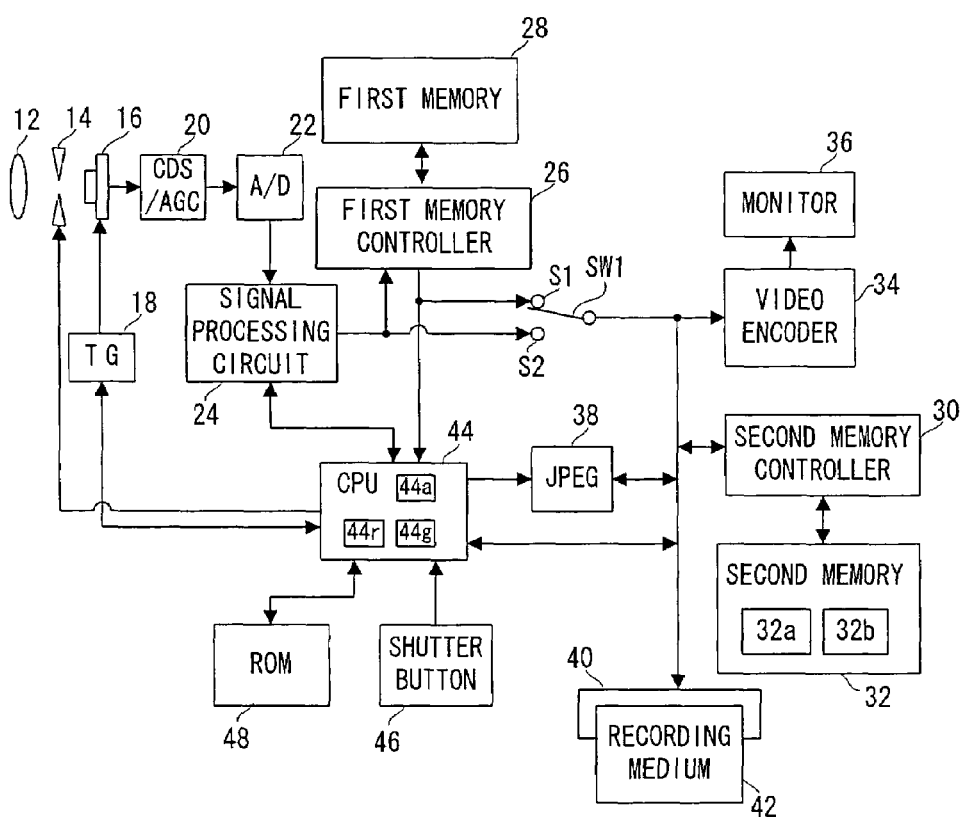
FIG. 9 is a block diagram showing another embodiment of the present invention.
Figure 10:
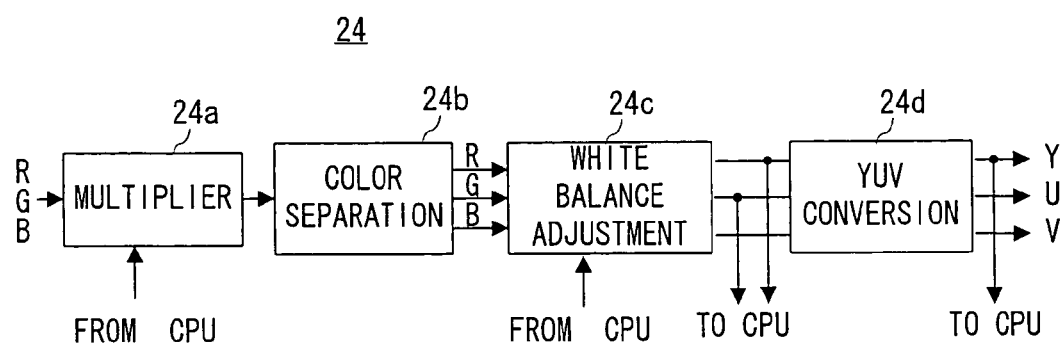
FIG. 10 is a block diagram showing one example of a signal processing circuit applied to FIG. 9 embodiment.
Figure 11:
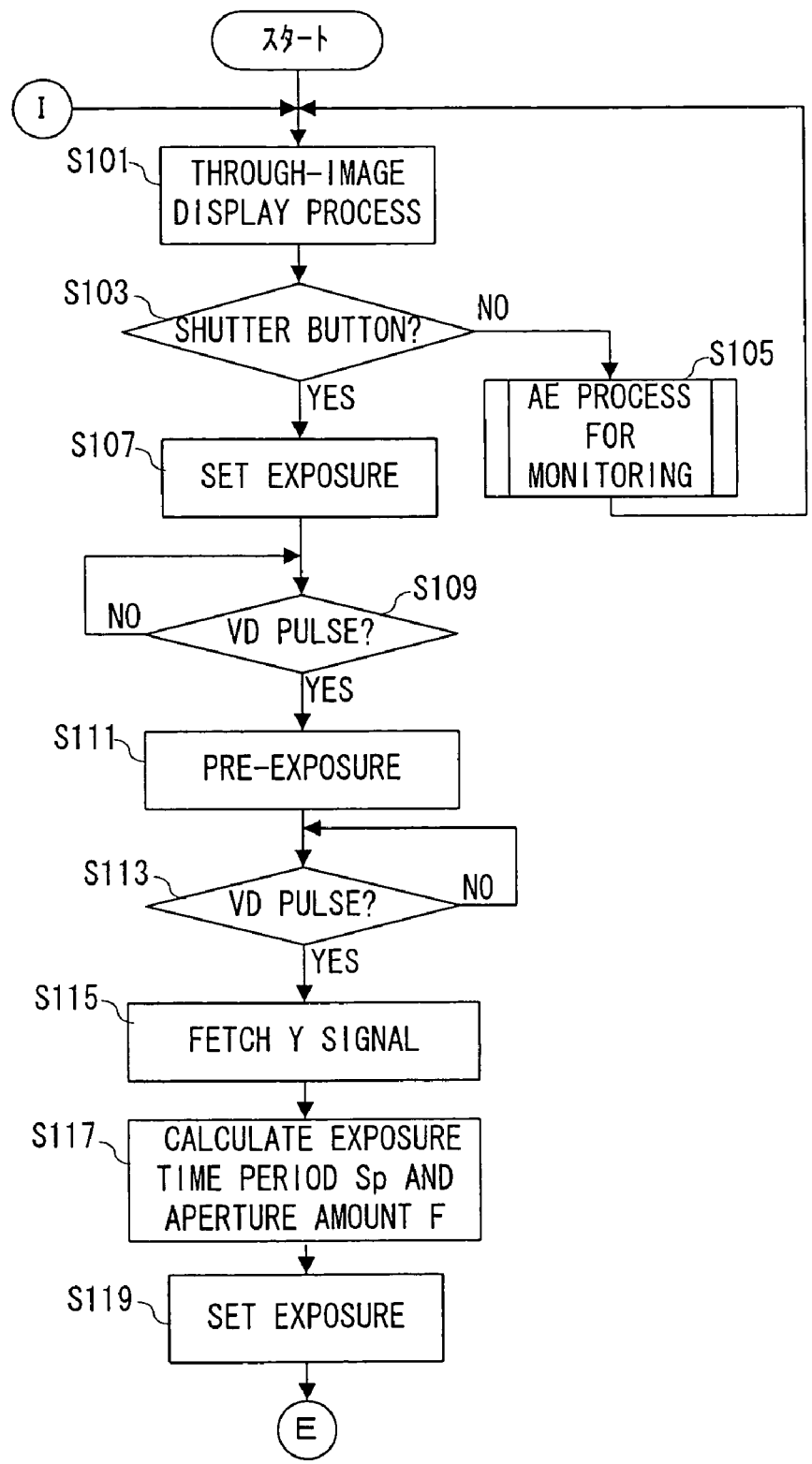
FIG. 11 is a flowchart showing a part of an operation of the CPU applied to FIG. 9 embodiment.
Figure 12:
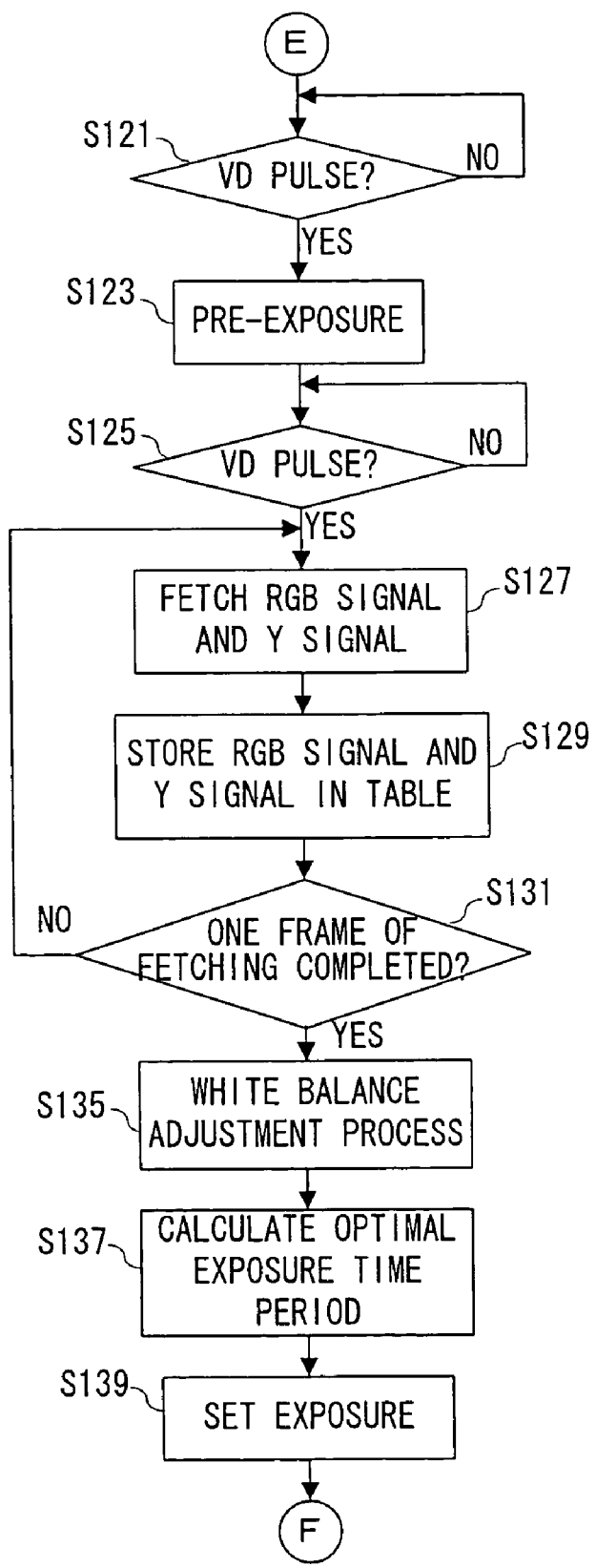
FIG. 12 is a flowchart showing another part of the operation of the CPU applied to FIG. 9 embodiment.
Figure 13:
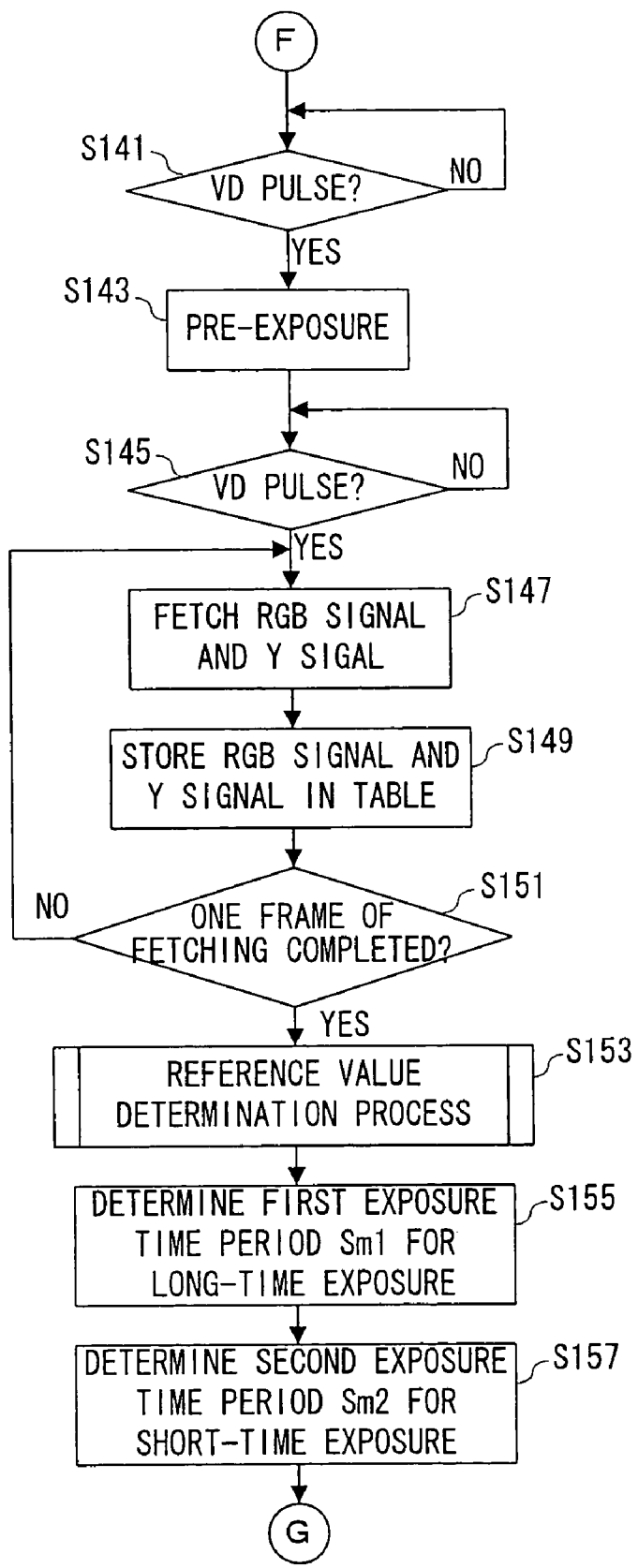
FIG. 13 is a flowchart showing the other part of the operation of the CPU applied to FIG. 9 embodiment.
Figure 14:
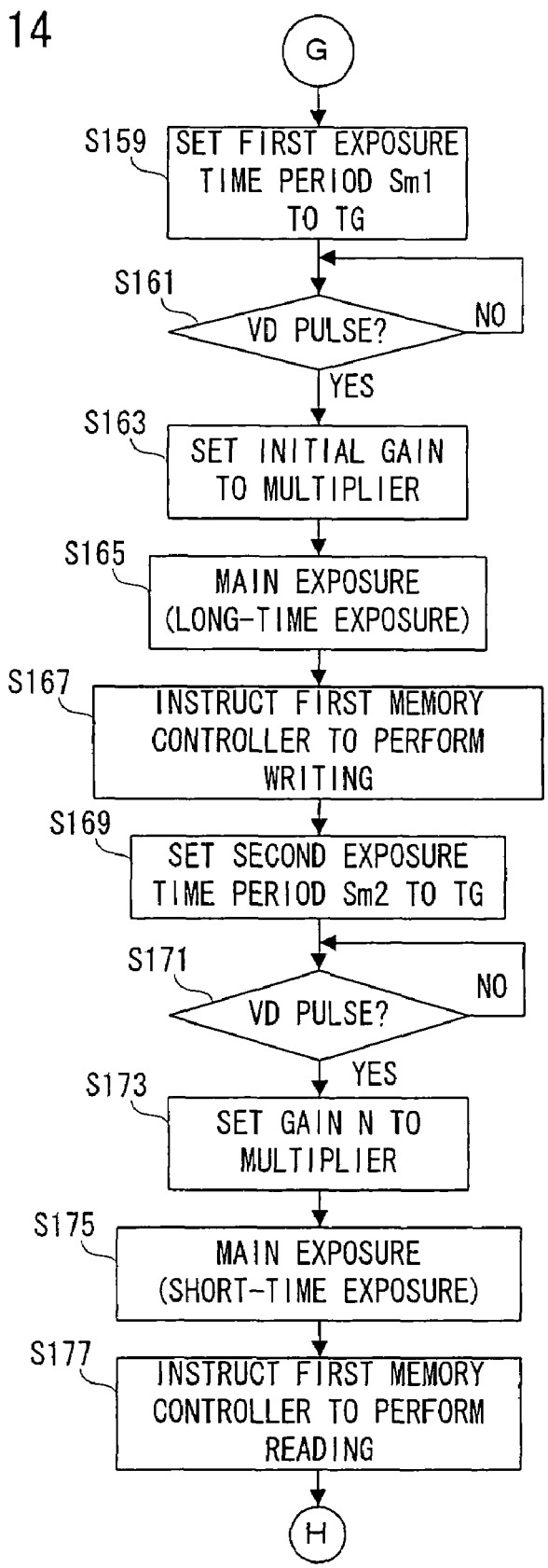
FIG. 14 is a flowchart showing a further part of the operation of the CPU applied to FIG. 9 embodiment.
Figure 15:
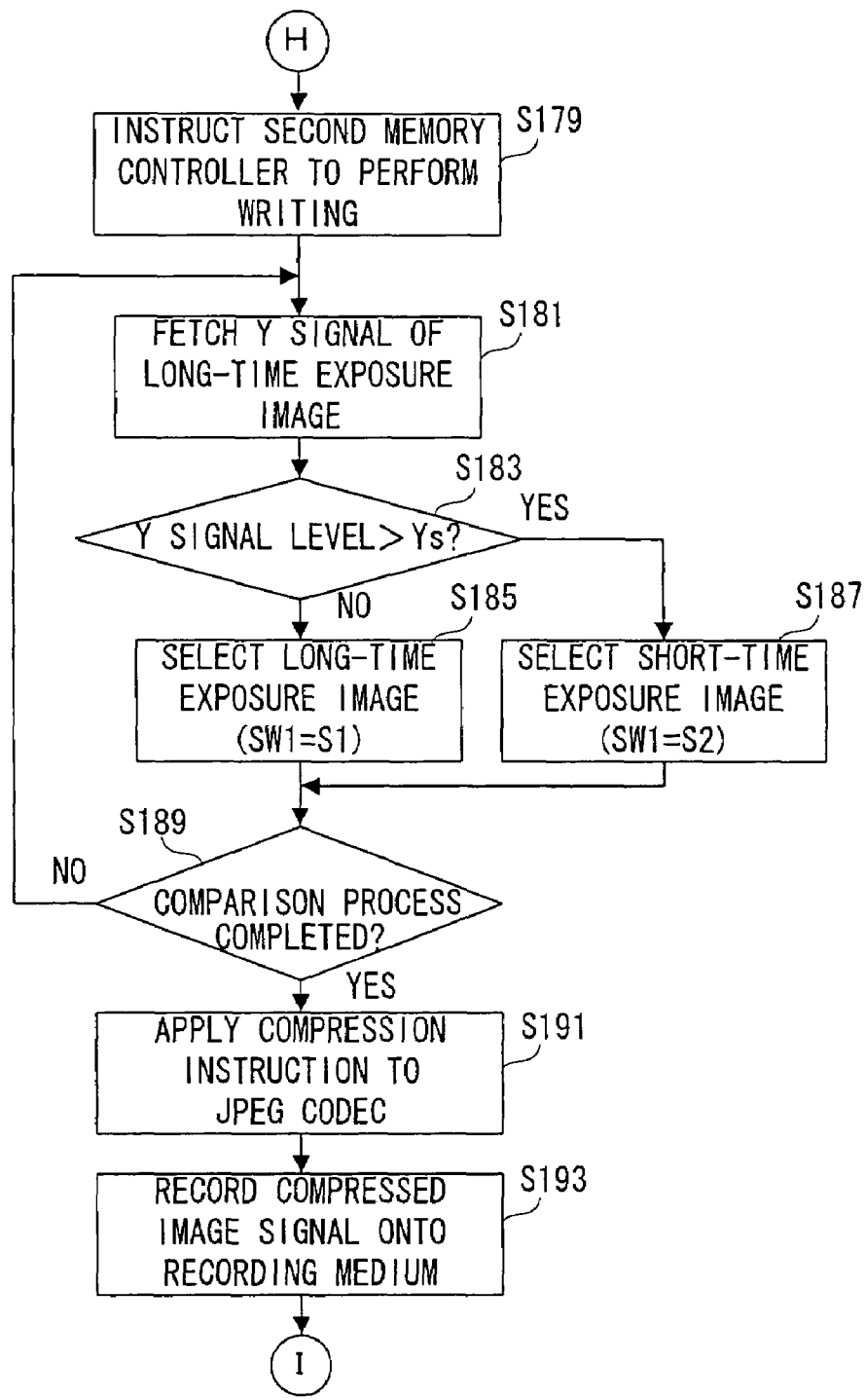
FIG. 15 is a flowchart showing another part of the operation of the CPU applied to FIG. 9 embodiment.

Referring to FIG. 9 and FIG. 10, the digital camera 10 of another embodiment is the same as FIG. 1 embodiment except that counters 44r and 44g are formed within the CPU 44 and the processes according to the flowchart shown in FIG. 11 to FIG. 17 are executed by the CPU 44. In addition, steps S101 to S131 shown in FIG. 11 and FIG. 12 are the same as the steps S1 to S31 shown in FIG. 3 and FIG. 4, and steps S155 to S193 shown in FIG. 13 to FIG. 15 are the same as the steps S39 to S77 shown in FIG. 4 to FIG. 6. Therefore, a duplicated description is omitted as to a common section.

The processes in the steps S127 and S129 shown in FIG. 12 are performed during one frame period, and if "YES" is determined in the step S131, the white balance adjustment process is performed in a step S135, and the optimal exposure time period is calculated in a step S137. The white balance adjustment and calculation of the optimal exposure time period are performed on the basis of an RGB signal and a Y signal stored in the table 44a. When the optimal exposure time period is calculated, the optimal exposure time period is set to the TG 18 in a step S139.

It is determined whether or not a VD pulse is generated in a step S141, and if "YES" is determined, a pre-exposure is performed in a step S143. The pre-exposure is executed according to the aperture amount F calculated in the step S117 and the optimal exposure time period calculated in the step S137. When the VD pulse is generated after the pre-exposure according to the optimal exposure amount, "YES" is determined in a step S145, and processes the same as in the steps S127 to S131 are performed in steps S147 to S151. Thus, one frame of the RGB signal and the Y signal based on the pre-exposure in the step S143 is stored in the table 44a. If "YES" is determined in the step S151, the process proceeds to the step S155 through a reference value determination process in a step S153.

Figure 16:
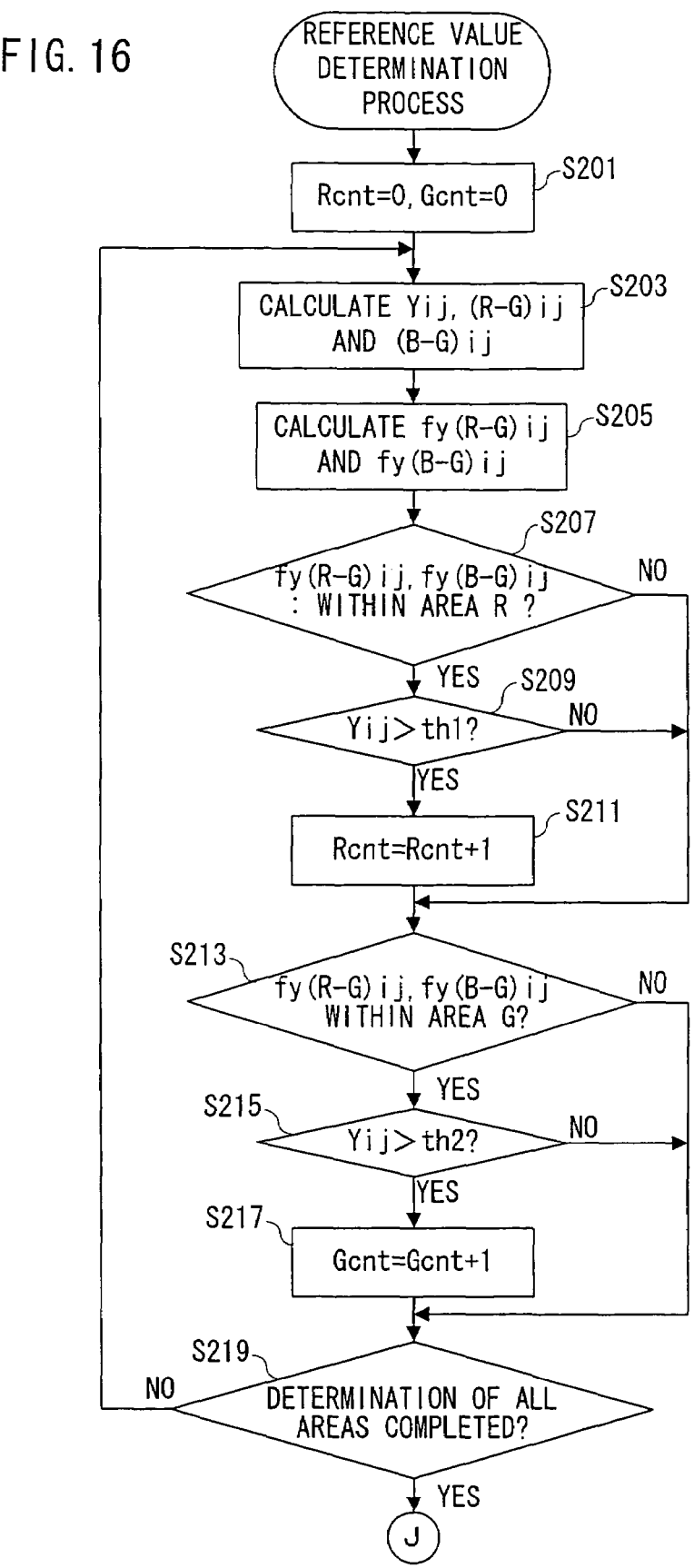
FIG. 16 is a flowchart showing the other part of the operation of the CPU applied to FIG. 9 embodiment.
Figure 17:
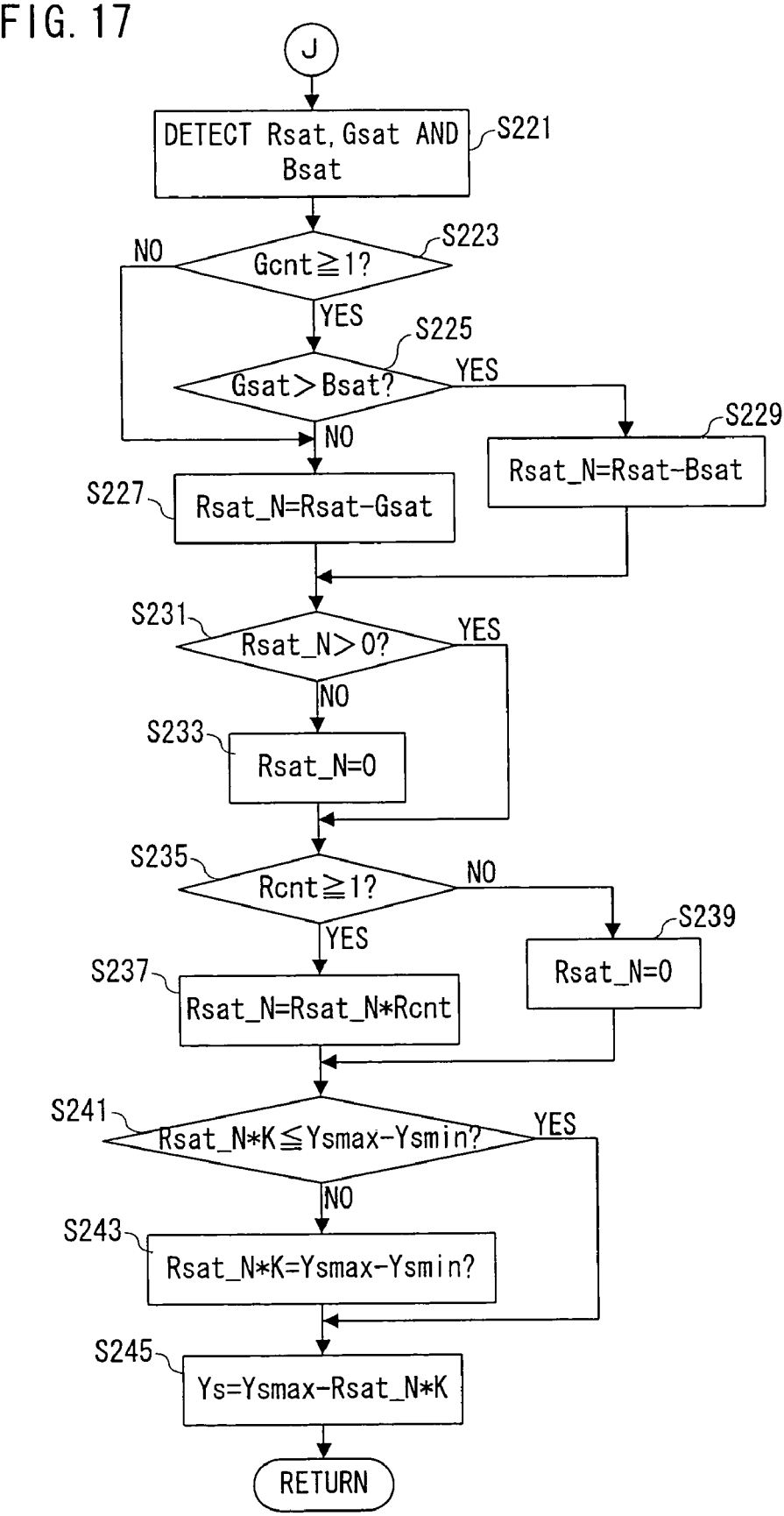
FIG. 17 is a flowchart showing a further part of the operation of the CPU applied to FIG. 9 embodiment.

The reference value determination process in the step S153 is executed by a subroutine shown in FIG. 16 and FIG. 17. First, a count value Rcnt of the counter 44r and a count value Gcnt of the counter 44g are set to "0" in a step S201, and Yij, (R–G) ij and (B–G) ij are calculated with reference to the table 44a in a step S203.

Figure 18:
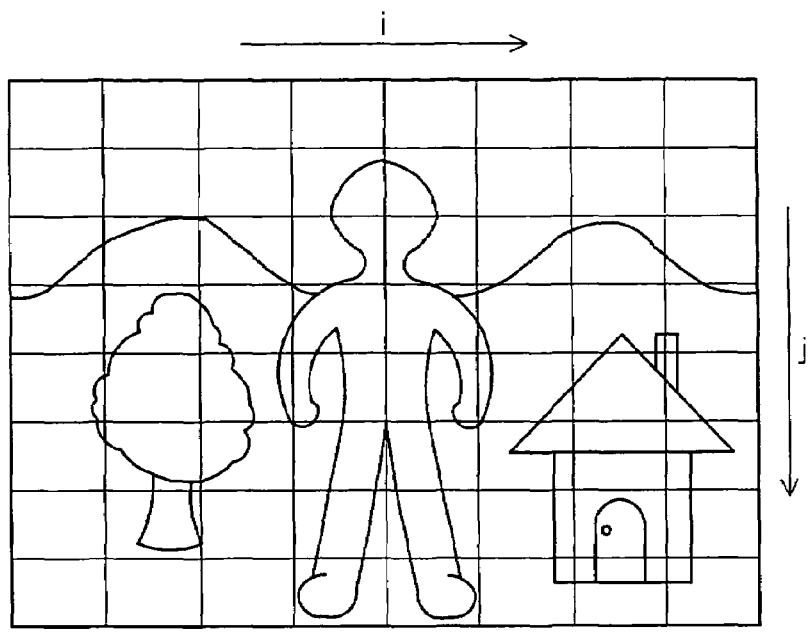
FIG. 18 is an illustrative view showing a part of an operation of FIG. 9 embodiment.

An object image is, as shown in FIG. 18, divided into 8 in a horizontal direction and in a vertical direction, and whereby, divided areas of 64 are formed on the screen. i and j indicate positions of the divided areas in the horizontal direction and in the vertical direction, and any one of "1" to "8" is assigned to the i and the j. The Yij indicates an integral value detected from the divided area (i, j) and can be defined as a luminance evaluation value. On the other hand, the (R–G) ij indicates a difference between integral values respectively based on the R signal and the G signal detected from the divided area (i, j), and the (B–G) ij indicates a difference of integral values respectively based on the B signal and the G signal detected from the divided area (i, j).

An arithmetic operation of an equation 4 is executed in a step S205. According to the equation 4, each of the (R–G) ij and the (B–G) ij is divided by the luminance evaluation value.

$$fy\ (R-G)\ ij = (R-G)\ ij/Yij \quad \text{[equation 4]}$$
$$fy\ (B-G)\ ij = (B-G)\ ij/Yij$$

Each of the values indicated by the (R–G) ij and the (B–G) ij reflects the exposure amount at a time of performing the pre-exposure. That is, the more the exposure amount is, the larger the numerical value is while the less the exposure amount is, the smaller the numerical value is. When each of the (R–G) ij and the (B–G) ij having such the characteristics is defined as a color evaluation value in each of divided areas, the color evaluation value varies by the exposure amount. On the other hand, the color of the object is essentially independent of the exposure amount and is constant at all times unless the object and the light source are changed. Accordingly, even if the exposure amount is changed, the color evaluation value should take the same value. Therefore, each of the (R–G) ij and the (B–G) ij is divided by the luminance evaluation value Yij relating to the exposure amount according to the equation 4, and a divided value is rendered the color evaluation value. Thus, the color evaluation value becomes independent of the exposure amount, and this makes it possible to accurately evaluate the color of the object.

Figure 19:
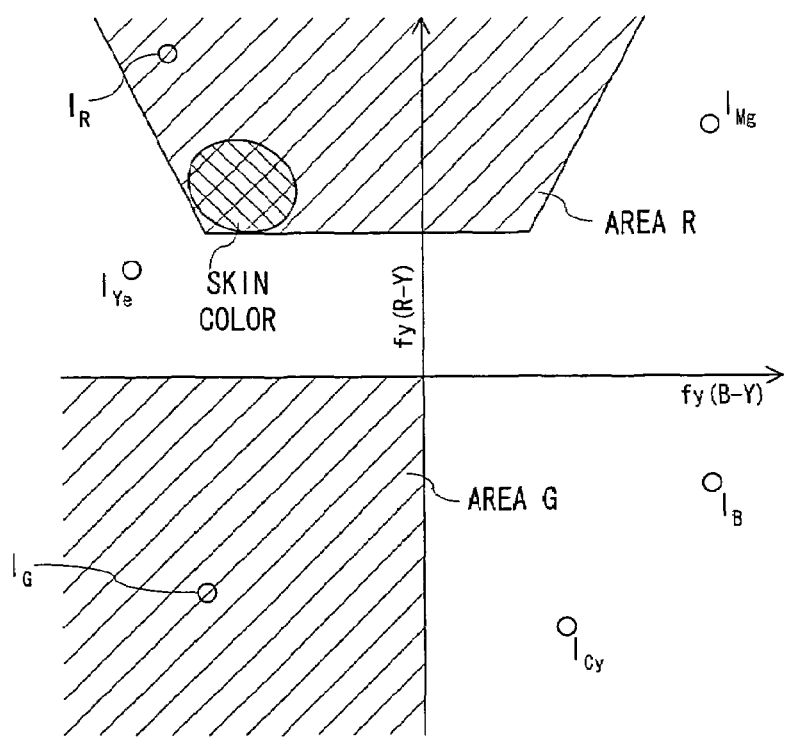
FIG. 19 is an illustrative view showing another part of the operation of FIG. 9 embodiment.

It is determined whether or not the fy (R–G) ij and the fy (B–G) ij are included in an area R of a color distribution map shown in FIG. 19 in a step S207, and it is determined whether or not the Yij exceeds a threshold value th1 in a step S209. If "NO" is determined in any one of the steps S207 and S209, the process directly proceeds to a step S213 while if "YES" is determined in both of the steps S207 and S209, the count value Rcnt is incremented in a step S211 and then, the process proceeds to the step S213. Accordingly, the count value Rcnt is incremented when the color evaluation value at a noticed divided area belongs to the area R, and an image in the divided area has a high luminance.

It is determined whether or not the fy (R–G) ij and the fy (B–G) ij are included in an area G of the color distribution map shown in FIG. 19 in the step S213, and it is determined whether or not the Yij exceeds a threshold value th2 in a step S215. If "NO" is determined in the step S213 or S215, the process directly proceeds to a step S219 while if "YES" is determined in both of the steps S213 and S215, the count value Gcnt is incremented in a step S217 and then, the process proceeds to a step S219. Accordingly, the count value Gcnt is incremented when the color evaluation value at the noticed divided area belongs to the area G, and the image in the divided area has a high luminance.

It is determined whether or not a determination process with respect to all the divided areas shown in FIG. 18 is performed in the step S219, and the processes in the steps S203 to S217 are repeated until "YES" is determined. Consequently, the count value Rcnt is renewed according to a determination result of the steps S207 and S211, and the count value Gcnt is renewed according to a determination result of the steps S213 and S215.

The area R shown in FIG. 19 is the area including a large amount of R component, and the area G is the area including a large amount of G component. Accordingly, the more the section having the high luminance and including the R component is, the larger the count value Rcnt is, and the more the section having the high luminance and including the G component is, the larger the count value Gcnt is. Furthermore, as understood from FIG. 19, the area R also includes the color of the skin of the person. Therefore, when photographing the face of the person at a bright place, the count value Rcnt is incremented at a time of determining a divided area in which an image of the face exists.

Each of the Rsat, the Gsat and the Bsat is detected with reference to the table 44a in a step S221. As described above, the Rsat is the color saturation degree relating to the R, and the Gsat is the color saturation degree relating to the G. Furthermore, the Bsat is the total number of pixels in which the B level is saturated and can be defined as the color saturation degree relating to the B.

The count value Gcnt is determined in a step S223, and the Gsat is compared with the Bsat in a step S225. If a condition of Gcnt=0 is satisfied, or if a condition of Gsat $\leq$ Bsat is satisfied even if Gcnt$\geq$1, the process proceeds to a step S227. On the other hand, if Gcnt $\geq$1 and Gsat >Bsat, the process proceeds to a step S229. The Rsat_N is calculated according to an equation 5 in the step S227, and the Rsat_N is calculated according to an equation 6 in the step S229.

$$Rsat\_N = Rsat - Gsat \qquad \text{[equation 5]}$$

$$Rsat\_N = Rsat - Bsat \qquad \text{[equation 6]}$$

As described above, generally, when the G signal is saturated, the luminance level is also saturated, and therefore, the Gsat is defined as the luminance saturation degree in FIG. 1 embodiment. Then, by subtracting the Gsat from the Rsat, the total number of pixels in which the luminance level is not saturated but the R level is saturated is obtained. However, with respect to some objects, the luminance level is not saturated while the G level is saturated, and in such the object, the Gsat cannot be defined as the luminance saturation degree. On the other hand, when the luminance level is saturated, not only the G level but also the B level is saturated, and therefore, a smaller numerical value out of the Gsat and the Bsat approximates to the number of pixels in which the luminance level is saturated. Therefore, by comparing the Gsat and the Bsat with each other in the step S225 and subtracting the smaller numerical value from the Rsat, the Rsat_N being the deviation degree of the R signal is acquired.

Furthermore, when Gcnt=0, the G component is not included in the object, or luminance of the object is entirely low. Therefore, in accordance with a principal, the Gsat is defined as the luminance saturation degree. At this time, the process proceeds to the step S227 without performing a comparison process in the step S225, and the Rsat_N is obtained according to the equation 5.

A value of the calculated Rsat_N is determined in a step S231. Then, if a condition of Rsat_N >0 is satisfied, the process directly proceeds to a step S235, and if a condition of Rsat_N $\leq$0 is satisfied, "0" is set to the Rsat_N in a step S233, and then, the process proceeds to the step S235. The processes are the same as that in the steps S87 and S89 shown in FIG. 7.

The count value Rcnt is compared with "1" in the step S235. Then, if a condition of Rcnt $\geq$1 is satisfied, the Rsat_N is renewed according to an equation 7 in a step S237, and if a condition of Rcnt=0 is satisfied, "0" is set to the Rsat_N in a step S239.

$$Rsat\_N = Rsat\_N * Rcnt \qquad \text{[equation 7]}$$

When the Rsat_N is determined, processes the same as the processes in the steps S91 to S95 in FIG. 7 are performed in steps S241 to S245. Thus, the reference value Ys is determined.

Since a general user is apt to select a person as the object, a situation in which a distortion of a hue occurs in an image of the skin of the person has to be avoided. Therefore, the R component most included in the image of the skin of the person is noticed, and when the condition of Rcnt $\geq$1 is satisfied, the Rsat_N is multiplied by the Rcnt. That is, the deviation degree of the R is weighed depending upon the number of the divided areas which has a high luminance and belongs to the R area. Thus, the larger the count value Rcnt is, the lower the reference value Ys is, and the short-time exposure image signal becomes easy to be selected by the switch SW1 shown in FIG. 9. Consequently, the distortion of the hue with respect to a color including the R component is controlled.

It is noted that when Rcnt=0, "0" is set to the Rsat_N, and whereby, the reference value Ys is set to the maximum value Ysmax. The count value Rcnt becomes "0" when the images of all the divided areas have a low luminance or never include the R component. In such the case, the hue is probably not distorted even if the reference value Ys is set to the maximum value Ysmax, and therefore, the reference value Ys is set to the maximum value Ysmax.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image combining apparatus which generates, on the basis of a first image signal of an object obtained by a first exposure according to a first exposure amount and a second image signal of said object obtained by a second exposure according to a second exposure amount which is less than said first exposure amount, a combined image signal of said object, comprising:
    a comparer for comparing a brightness relating level of any one of said first image signal and said second image signal with a reference value;
    a first selector for selecting said first image signal when said brightness relating level is equal to or less than said reference value;
    a second selector for selecting said second image signal when said brightness relating level is larger than said reference value;
    a deviation degree detector for detecting a deviation degree of color of said object, the deviation degree of color relating to a hue distortion that occurs when a color level of a specific color is saturated; and
    a reducer for reducing said reference value on the basis of said deviation degree.

2. An image combining apparatus according to claim 1, further comprising a fetcher for fetching a third image signal of said object obtained by an exposure according to a predetermined exposure amount, wherein
    said deviation degree detector includes a color saturation degree detector for detecting a color saturation degree of a specific color based on said third image signal, a luminance saturation degree detector for detecting a luminance saturation degree of aid third image signal and a subtracter for subtracting said luminance saturation degree from said color saturation degree.

3. An image combining apparatus according to claim 2, wherein said color saturation degree detector detects a first number of pixels in which a color level of said specific color is saturated, and said luminance saturation degree detector detects a second number of pixels in which a luminance is saturated.

4. An image combining apparatus according to claim 3, wherein said predetermined exposure amount is less than said first exposure amount and more than said second exposure amount.

5. An image combining apparatus according to claim 3, wherein said reducer greatly reduces said reference value as said deviation degree is large.

6. An image combining apparatus according to claim 3, further comprising a determiner for determining whether or not each of a plurality of sections forming an object image satisfies a predetermined condition, and wherein said reducer includes a weighting for weighting the deviation degree depending upon the number of sections satisfying the predetermined condition and a reference value reducer for reducing said reference value on the basis of a result of the weighting by said weighter.

7. A digital camera provided with an image combining apparatus according to claim 3.

8. An image combining apparatus according to claim 2, wherein said predetermined exposure amount is less than said first exposure amount and more than said second exposure amount.

9. An image combining apparatus according to claim 8, wherein said reducer greatly reduces said reference value as said deviation degree is large.

10. An image combining apparatus according to claim 8, further comprising a determiner for determining whether or not each of a plurality of sections forming an object image satisfies a predetermined condition, and wherein said reducer includes a weighter for weighting the deviation degree depending upon the number of sections satisfying the predetermined condition and a reference value reducer for reducing said reference value on the basis of a result of the weighting by said weighter.

11. A digital camera provided with an image combining apparatus according to claim 8.

12. An image combining apparatus according to claim 2, wherein said reducer greatly reduces said reference value as said deviation degree is large.

13. An image combining apparatus according to claim 2, further comprising a determiner for determining whether or not each of a plurality of sections forming an object image satisfies a predetermined condition, and wherein said reducer includes a weighting for weighting the deviation degree depending upon the number of sections satisfying the predetermined condition and a reference value reducer for reducing said reference value on the basis of a result of the weighting by said weighter.

14. A digital camera provided with an image combining apparatus according to claim 2.

15. An image combining apparatus according to claim 1, wherein said reducer greatly reduces said reference value as said deviation degree is large.

16. An image combining apparatus according to claim 1, further comprising a determiner for determining whether or not each of a plurality of sections forming an object image satisfies a predetermined condition, and wherein said reducer includes a weighter for weighting the deviation degree depending upon the number of sections satisfying the predetermined condition and a reference value reducer for reducing said reference value on the basis of a result of the weighting by said weighter.

17. An image combining apparatus according to claim 16, wherein the predetermined condition includes a first condition indicating that a noticed section is a specific color and a second condition indicating that said noticed section has a high luminance.

18. A digital camera provided with an image combining apparatus according to claim 1.

19. An image combining method which generates, on the basis of a first image signal of an object obtained by a first exposure according to a first exposure amount and a second image signal of said object obtained by a second exposure according to a second exposure amount which is less than said first exposure amount, a combined image signal of said object, comprising following steps of:

(a) comparing a brightness relating level of any one of said first image signal and said second image signal with a reference value;

(b) selecting said first image signal when said brightness relating level is equal to or less than said reference value;

(c) selecting said second image signal when said brightness relating level is larger than said reference value;

(d) detecting a deviation degree of color of said object, the deviation degree of color relating to a hue distortion that occurs when a color level of a specific color is saturated; and (e) reducing said reference value on the basis of said deviation degree.

20. An image combining method according to claim 19, further comprising a step (f) of fetching a third image signal of said object obtained by an exposure according to a predetermined exposure amount, wherein said step (d) includes a step (d-1) of detecting a color saturation degree of a specific color on the basis of said third image signal, a step (d-2) of detecting a luminance saturation degree of said third image signal and a step (d-3) of subtracting said luminance saturation degree from said color saturation degree.

* * * * *